May 31, 1955     B. S. HARRINGTON     2,709,538
FILLING MACHINE
Filed April 7, 1951     3 Sheets-Sheet 1
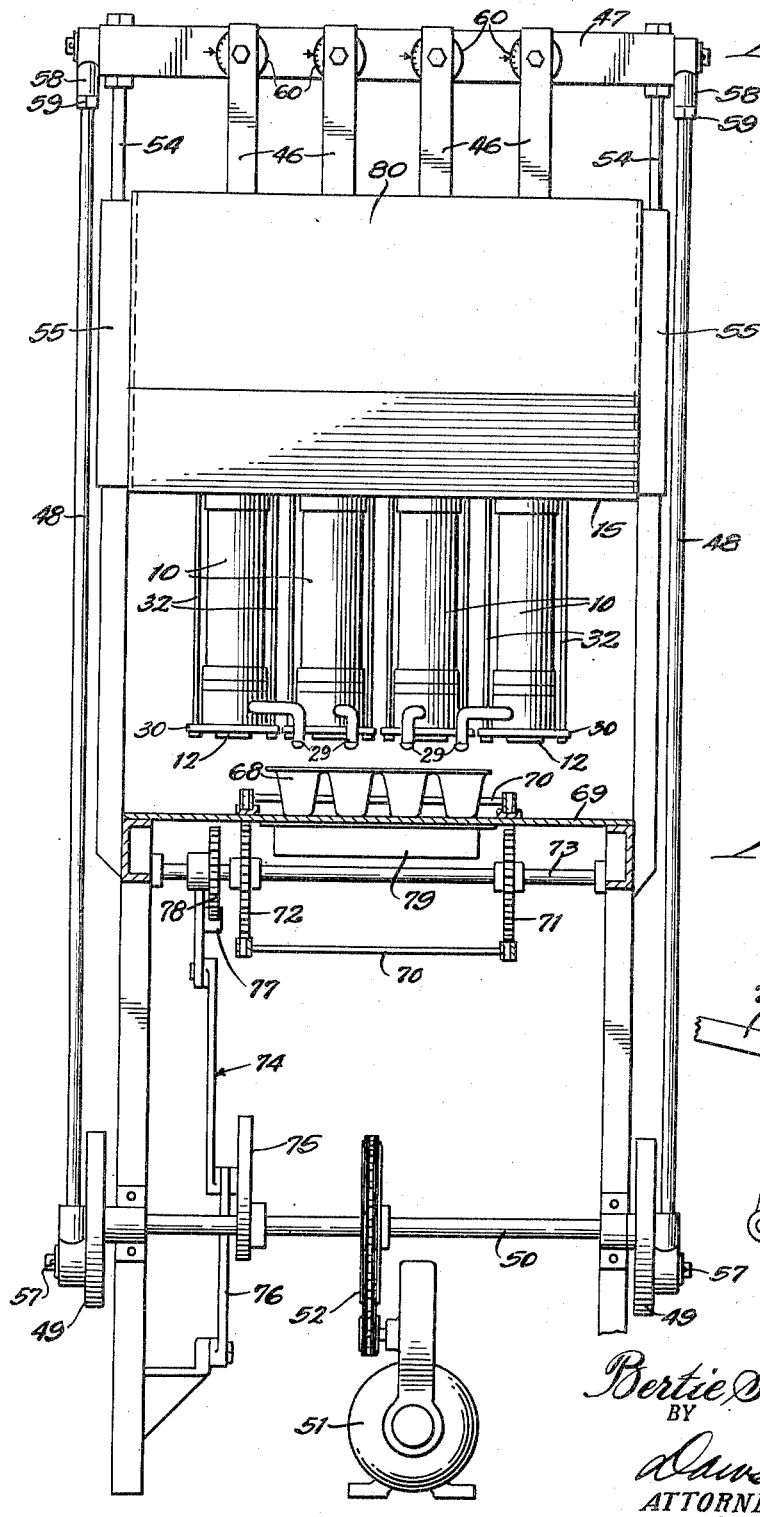
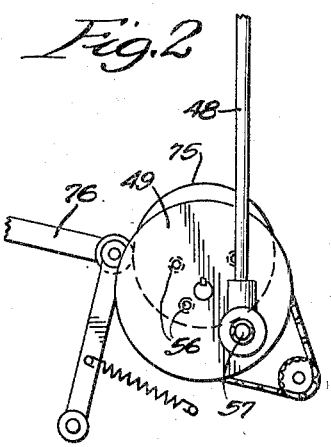
INVENTOR:
Bertie S. Harrington,
BY
Dawson & Ooms
ATTORNEYS.

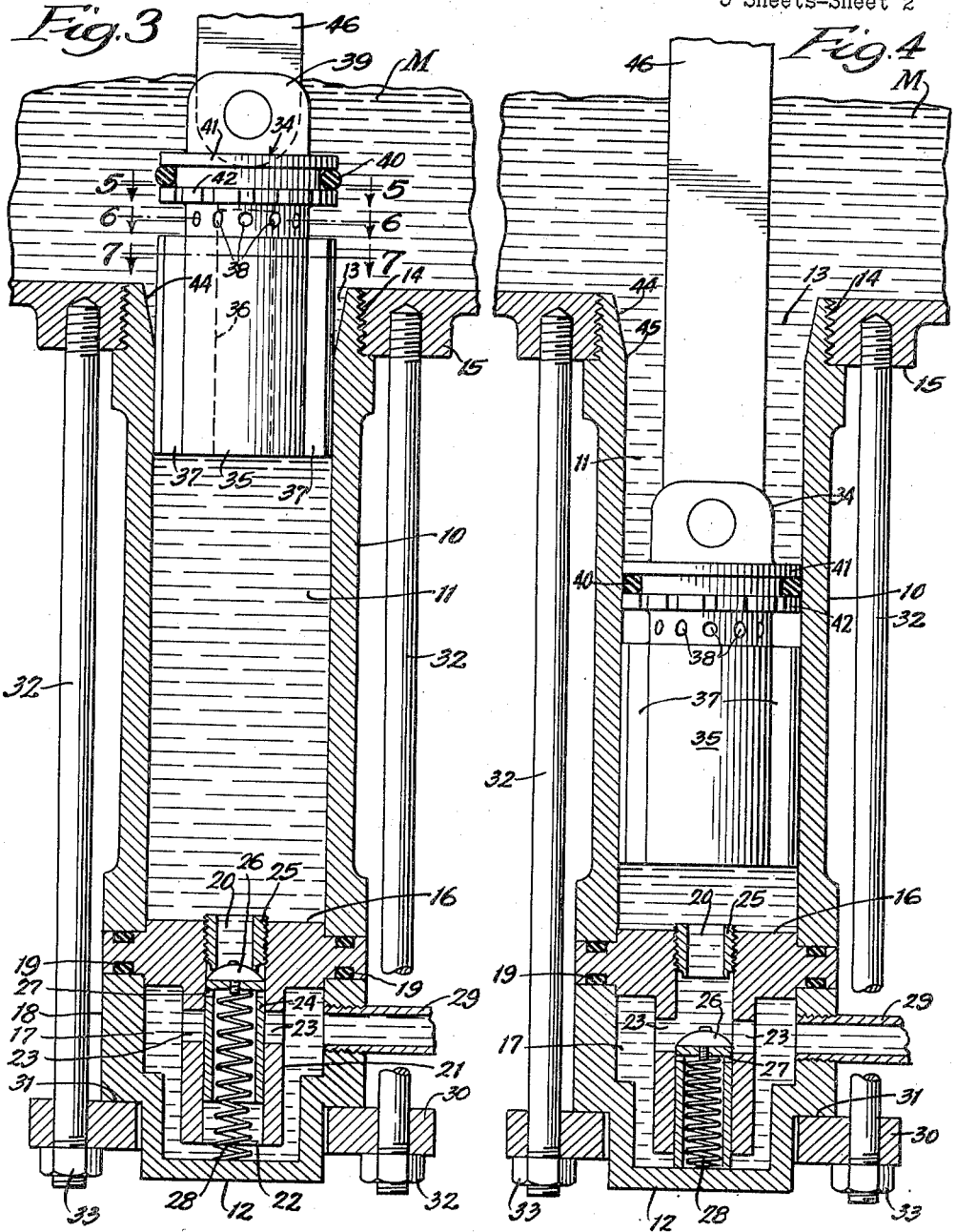

May 31, 1955     B. S. HARRINGTON     2,709,538
FILLING MACHINE
Filed April 7, 1951     3 Sheets-Sheet 3
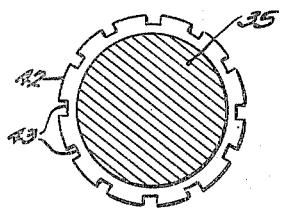
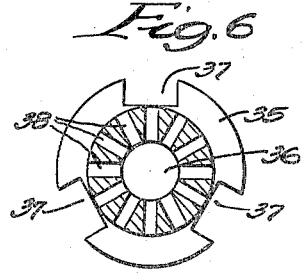
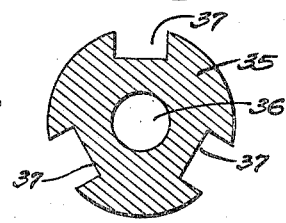
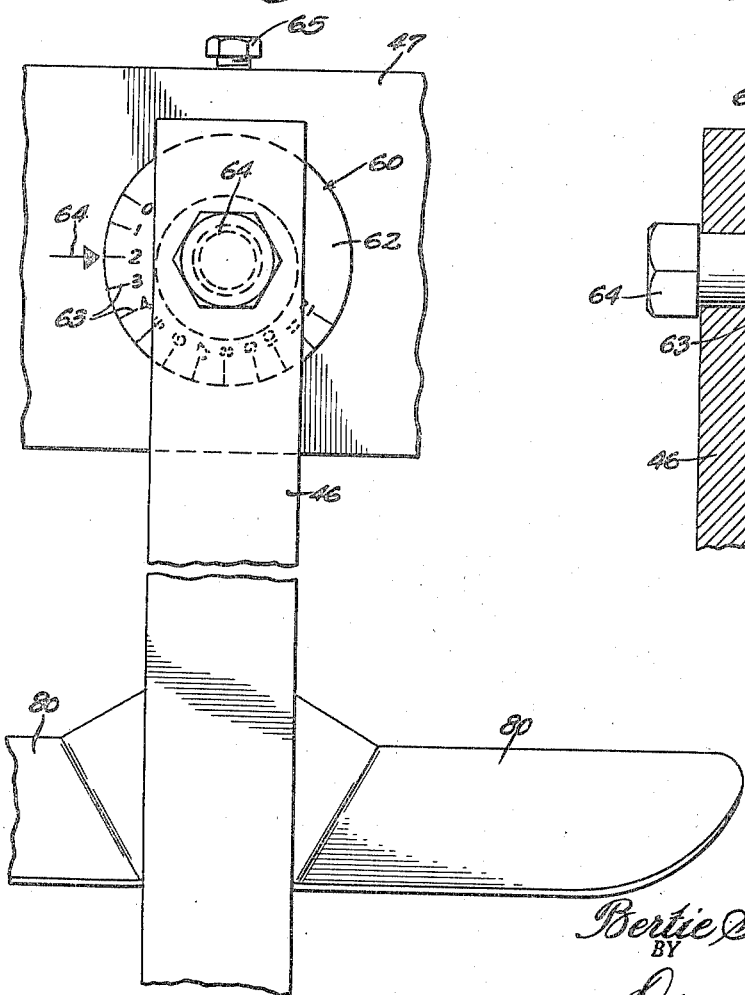
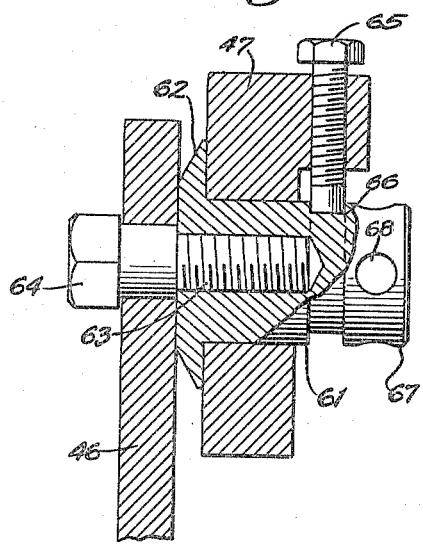
INVENTOR:
Bertie S. Harrington,
BY
Dawson & Ornes,
ATTORNEYS.

United States Patent Office 2,709,538
Patented May 31, 1955

2,709,538

FILLING MACHINE

Bertie S. Harrington, Chicago, Ill., assignor to Armour and Company, Chicago, Ill., a corporation of Illinois Application April 7, 1951, Serial No. 219,785

15 Claims. (Cl. 222—108)

My invention relates to a filling machine for materials at least partially in liquid form. My filling machine has special utility in connection with the dispensing of measured quantities of semi-solid materials such as butter and oleomargarine in partially melted condition. However, my filling machine can also be advantageously used for dispensing liquids and particularly liquids having solid materials therein in the form of an emulsion or otherwise, such as salad dressings, partially melted cheese spreads, etc.

It is an object of my invention to develop a filling machine which is particularly adapted for the filling of semi-solid materials such as oleomargarine and butter in partially melted condition. More specifically, it is an object of my invention to develop a measuring cylinder structure which can be positioned with one end extending into a heated vat containing the butter or oleomargarine and will fill from that end directly from the vat. It is another object of my invention to develop a filling machine in which the measuring cylinder and piston assembly can be quickly and conveniently assembled and disassembled for cleaning purposes. It is a still further object of my invention to develop a filling machine for dispensing semi-liquid or liquid materials with a high degree of accuracy as to the weight of material dispensed in every operation. Also, it is an object of my invention to develop a filling machine in which the amount dispensed by the measuring cylinder can be varied as desired and adjusted accurately for dispensing desired measuring weights over a relatively large weight range. Another object of my invention is to provide a check valve structure for use in my filling machine which will not only operate as a check valve but which will also create a back suction in the outlet passage to sharply terminate the flow of material from the outlet nozzle and to prevent dripping of the material. Further objects and advantages will appear as the specification proceeds.

My invention is shown in an illustrative embodiment in the accompanying drawings in which—

Figure 1 is a front elevational view of a dispensing machine involving the new structures of my invention; Fig. 2, a partial side view of the gear mechanism for imparting reciprocating motion to the cross beam from which are suspended the driving arms; Fig. 3, a front sectional view of one of the measuring cylinders shown in Fig. 1 with the outlet check valve in closed position and the piston plug in raised position; Fig. 4, a view similar to Fig. 3 but showing the outlet check valve in open position and the piston plug in its downward position; Fig. 5, a cross-sectional view taken on line 5—5 of Fig. 3 showing the notched flange below the sealing ring; Fig. 6, a cross-sectional view taken on line 6—6 of Fig. 3 showing the surface channels and the interior passages in the piston plug; Fig. 7, a cross-sectional view taken on line 7—7 of Fig. 3 showing the surface channels and the interior opening at a lower point in the plug; Fig. 8, a fragmentary enlarged front view of the driving arm and cross beam connection showing the vernier adjustment for the bottom point of the piston stroke; and Fig. 9, a side cross-sectional view of the vernier and attachment structure shown in Fig. 8.

Looking first at Figs. 3 and 4, which illustrate one embodiment of the measuring cylinder and dispensing assembly of my invention, 10 represents generally a casing providing a circular elongated chamber 11 therein and having a closed end 12 and an open end 13.

In the illustration given, the open or upper end 13 of casing 10 is threadedly connected at 14 to a horizontal plate 15. As will be subsequently described in detail, plate 15 can conveniently form the bottom or side of a vat containing the liquid or semi-liquid material to be filled, which in Figs. 3 and 4 is designated as M.

The portion of chamber 11 near closed end 12 can be equipped with any suitable outlet port or passage having an outlet check valve therein which effectively prevents material from being drawn back into chamber 11 after passing out through the passage or port in the closed end portion thereof. However, I prefer to utilize the check valve structure shown in Figs. 3 and 4 which serves as a combination check valve and suction plug, as will be explained.

In the illustration given, a partition member 16 is placed across chamber 11 at a spaced distance from closed end 12 to provide a smaller chamber 17 therebetween. If desired, casing 10 can be separated at the point where it is desired to position partition member 16, and member 16 can be inserted in abutting relation with the severed ends of casing 10 as shown in Figs. 3 and 4. Thus, in effect cup-shaped end portion 18 forms an extension of casing 11 and provides interiorly a smaller chamber 17. If this form of construction is used, it is desirable to provide sealing means between partition member 16, cup end 18, and casing 10, such as sealing rings 19. The advantage of forming cup end 18 separately is that it can easily be removed for cleaning the valve mechanism contained therein. Partition member 16 is provided with a passage or opening 20 therethrough connecting measuring chamber 11 with the smaller chamber 17. A valve guide tube 21, is connected to partition member 16 in alignment with passage 20 so as to extend toward the closed end 12 of casing 10 but terminating at a spaced distance therefrom so that the interior passage 22 of guide tube 21 is in communication with chamber 17 at the end of guide 21. If desired, guide member 21 and partition member 16 can be integrally formed as shown. Guide tube 21 is provided with ports 23 in the sides thereof communicating with chamber 17.

Within guide member 21 a sleeve 24 is slidably mounted so as to act as a floating piston therein. Above ports 23 within passage 20 there is located a valve seat member 25. Preferably, valve seat 25 is made longitudinally adjustable such as by threadably connecting it to partition member 16 as shown. A valve plug 26 may be mounted on the inner closed end of sleeve 24. Preferably, valve plug 26 is rounded and composed of a flexible resilient material such as rubber so as to sealably engage valve seat 25 when urged into engagement therewith. Sleeve 24 is also provided with air vents 27 positioned to be alignable with ports 23 when valve plug 26 has moved outward sufficiently to partially open and disclose ports 23 so that material can pass from chamber 11 into chamber 23. The purpose of air vents 27 is to exhaust air which may be trapped within sleeve 24 after cleaning of the valve assembly, etc. This functioning will subsequently be more completely described. A combination spring 28 is mounted within sleeve 24 so as to normally urge valve plug 26 into engagement with valve seat 25.

An outlet passage 29 is provided from chamber 17 for the outflow of fluids therefrom to a dispensing nozzle or other suitable dispensing equipment. While outlet passage 29 can be made to communicate with chamber 17 at any desired point in cup end 18, I prefer to have passage 29 enter chamber 17 in the side rather than the bottom of cup member 18 so that the air trapped within sleeve 24 can be more easily exhausted therefrom, and so that passage 29 can be aligned with ports 23.

In the illustration given, a yoke or clamp member 30 is provided about the end of cup member 18 abutting against shoulders 31. Tie rods 32 are rotatably inserted in plate 15 in alignment with casing 10 so as to extend through apertures in yoke 30 having projecting threaded ends on which nuts 33 are attached to effectively clamp together cup member 18, partition member 16, and the upper portion of casing 10. It can readily be seen, that this structure allows the valve assembly which has just been described to be cleaned by simply removing two nuts from the ends of tie rods 32, whereupon cup member 18 and partition member 16 become detached from casing 10.

In order to provide the necessary alternating pressure and suction effects within chamber 11 to draw in the material to be dispensed and to force it out by means of the outlet check valve structure which has been described and into passage 29, there is provided a piston designated generally as 34.

In the illustration given, piston 34 has a rearward or outward extension 39 of reduced diameter for connection to the reciprocating means. Extension 39 inwardly can be provided with any suitable sealing means such as conventional piston rings, etc., so that when piston 34 is moved into chamber 11 its rearward portion on contacting the walls of chamber 11 will form a seal therewith. Preferably, however, I utilize a sealing member consisting of a flexible, resilient sealing ring 40, which can be composed of rubber or similar material. In the illustration given, sealing ring 40 is supported at right angles to the reciprocating axis of piston 34, and normally has a slightly greater diameter than chamber 11 so that when moved downwardly into contact with the walls of chamber 11 it will be compressed into a smaller diameter and thereby form a tight seal with the interior of casing 10.

In order to keep piston 34 and more particularly sealing ring 40 centered so as to make proper contact with the walls of chamber 11, it is desirable to provide a guide means secured to or integrally formed with piston 34 and extending inwardly therefrom into chamber 11.

In the illustration given, the guide means consists of an inwardly extending plug 35 circular in cross section and adapted to slide freely within casing 10 by being made of slightly smaller diameter than chamber 11, while holding piston 34 centered with respect to chamber 11. Since it is desired that the material to be dispensed shall flow into chamber 11 through the upper or open end 13 of casing 10, the guide means extending inwardly from the sealing means about piston 34 must be adapted to permit the flow of material therethrough. Therefore, guide plug 35 is equipped with passages extending from the inner end of the plug to points around the rear portion thereof inside of sealing ring 40. In the illustration given, plug 35 is equipped with both a longitudinal central passage 36, and longitudinal surface channels 37, as seen more clearly in Figs. 6 and 7. Near the outer end of plug 35, interior passage 36 is provided with peripheral communicating passages 38. Thus, chamber 11 is in communication with the exterior at the open end of casing 10 through interior passage 36 and peripheral connecting passages 38, as well as through surface channels 37, when piston 34 is in its raised or rearward position as shown in Fig. 3. It will be undestood that more than one longitudinal interior passage may be used if desired, or that alternatively either surface channels or interior passages may be used. In practice, I have found that surface channels alone give excellent performance.

In order to assure that sealing ring 40 will seal chamber 11 at exactly the same point during the inward or compression stroke of piston 34, I prefer to back sealing ring 40 with a solid annular flange 41 of slightly smaller diameter than the expanded diameter of sealing ring 40. Inwardly on the other side of sealing ring 40 I provide an annular flange 42 having a notched periphery, as seen more clearly in Fig. 5. The purpose of spaced notches 43 around the circumference of flange 42 is to allow the excess material being dispensed to leave chamber 11 by inflow passages 36 and 37 until the precise sealing line is reached during the inward stroke of piston 34. To maximize this effect, I prefer to flare or outwardly bevel the open end of casing 10 as indicated at 44. With this beveled structure and by employing notches 43, a seal between piston 34 and casing 10 is achieved exactly at the bottom of bevel 44, indicated at 45. The filling and measured discharging cooperation of piston 34 and casing 10 will subsequently be described in greater detail. It will be understood, however, if desired that flanges 41 and 42 can be integrally formed with reduced end portion 39.

Any suitable means can be provided for imparting a reciprocating motion to piston 34 within chamber 11. However, the means for reciprocating piston 34 is preferably adapted to limit the outward or rearward movement of piston 34 so that at least the forward portion of plug 35 remains within casing 10 to insure the correct alignment of piston 34 within cylinder 10. In the illustration given, the outer reduced end 39 of piston 34 is pivotally connected to driving arm 46. It will be understood that if desired a universal connection could be utilized instead of a pivotal connection, but this is not required when piston 34 is reciprocated so as to maintain the forward portion of plug 35 at all times within casing 10.

Looking now at Fig. 1, which shows four of my measuring cylinder and piston assemblies positioned with their open ends in the bottom of a vat 80, it can be seen that driving arms 46 can conveniently be attached to a cross beam 47, which can be mounted for reciprocating motion by any suitable arrangement. In the illustration given, cross beam 47 is attached at its outer ends to downwardly extending driving rods 48, which extend downwardly exterior to vat 47. As shown more clearly in Fig. 2 driving rods 48 are attached eccentrically to wheels 49 so as to be reciprocated by the rotation of wheels 49. Wheels 49 can be mounted on the outer ends of a driving shaft 50 which is driven by a motor 51 through a conventional gear linkage 52. It will be understood, that a frame 53 of any suitable construction can be utilized to support vat 47 and driving shaft 50; and to maintain the alignment of cross beam 47 with respect to driving rods 48. In the illustration given, guide arms 54 sliding in sleeves 55 are utilized to maintain the reciprocation of cross beam 47 in the same vertical plane.

Any suitable means can be provided for adjusting the reciprocation of cross beam 47 so that the bottom or inwardmost point of reciprocation can be varied as desired. In the illustration given, several additional apertures 56 at varying radial distances from the rotational center of driving shaft 50 are provided on wheels 49. Thus by shifting connecting pin 57 of driving rod 48 to different attachment apertures 56, the downward or inwardmost point of movement of cross beam 47 and thus pistons 34 can be varied by changing the overall length of stroke.

In order to make fine adjustments in the displacement of piston 34 in chamber 11, I prefer to utilize adjusting means which changes the downward or inwardmost point of the piston stroke while maintaining the same overall stroke imparted by wheel 49 to rods 48. This can be accomplished by providing adjustable threaded connection sockets 58 for the upper ends of driving rods 48. Rods 48 can then be rotated into or out of sockets 58 to vary the downwardmost line of reciprocation of cross beam 47. After the adjustment has been made, lock nuts 59 can be tightened to hold the adjustment. It will be understood, however, that any other suitable means for adjusting the length of rods 48 can be used, such as a turnbuckle, etc.

The adjustments permitted by a structure such as threaded sockets 58 have been found to permit only relatively coarse changes in the displacement of pistons 34, since it is difficult to make the desired adjustment with precise accuracy. Therefore, I prefer to equip driving rods 46 with a vernier adjustment 60 at their point of attachment to cross beam 47. The structure of this vernier adjustment and attachment assembly is shown more clearly in Figs. 8 and 9. A collar or housing member 61 is rotatably mounted in cross beam 47. Collar 61 provides an annular disk 62 on one end thereof designed to lie against the face of beam 47. If desired as shown, disk 62 can be marked with a suitable scale such as scale 63 to indicate its rotational position against a fixed point on the face of cross beam 47 as indicated by arrow 64. Collar 61 is further provided with a longitudinal opening 63 which can be threaded to receive a headed bolt 64 for securing driving arm 46 to housing 61. Hole 63 is formed so that its central axis is parallel to and at a spaced distance from the rotational axis of collar 61, so that the rotation of collar 61 will vary the distance from the center of hole 63 from the center of rotation of collar 61. By this means when the members are assembled as shown more clearly in Fig. 9, the lower or inwardmost point of movement of driving arm 46 can be precisely adjusted within a small range of adjustment by rotating collar 61. Preferably, collar 61 is provided with a locking device, such as bolt 65 locking into annular groove 66. If desired, an adjusting knob 67 can be provided on the other end of collar 61 from disk 62, and can be equipped with setting holes 68.

*Operation*

In Fig. 1 of the drawings, there is shown a filling machine constructed in accordance with my invention. In this filling machine four of the cylinder and piston assemblies shown in Figs. 3 and 4 are mounted with their open ends in the bottom of a vat 47, which contains the material to be dispensed in measured quantities. It will be understood that vat 47 or similar container can be equipped with a greater or lesser number of filling units than illustrated, and that the filling units can be orientated otherwise than vertically. For example, the casings can be mounted to extend from the side of a tank or vat, if desired. However, it has been found that the mechanical operation is best when the measuring cylinders are positioned in the bottom of the tank with their open end in communication with the interior of the tank or vat.

When it is desired to dispense materials such as butter or oleomargarine, vat 47 can be equipped with suitable heating means to maintain the butter or oleomargarine in a semi-melted condition so that it can be more easily dispensed, but not at such a high temperature that the product will be damaged or require too long to solidify within container 68.

Any suitable means such as a conveyor belt can be provided for alternately moving and stopping containers 68 in synchronism with the reciprocation of the pistons within the measuring cylinders. In the illustration given, a flat table 69 is employed as a stationary conveyor surface over which groups of containers are slid between cross arms 70 of endless conveyor chain 71 which passes over wheels 72 beneath table 69. Wheels 72 are mounted on axle 73 which is driven by a conventional linkage and gear arrangement 74 from shaft 50. Any suitable gear and drive linkage can be utilized for employing the rotational movement of shaft 50 to impart a synchronized alternating advancing movement and stationary positioning of chain 71 above table 69. In the structure shown, wheel 75 is mounted eccentrically on shaft 50 so as to displace linkage 76 and engage ratchet 77 with gear 78 over a timed interval for each rotation of wheel 75. Since this structure is well-known, it is not believed that it will be necessary to further describe it in this application. If desired when dispensing material such as butter or oleomargarine, the conveyor can be equipped with a vibrator 79 to assist in settling the dispensed material within the containers.

When dispensing semi-solid materials such as partially melted butter and oleomargarine, it is important to keep the material uniformly mixed. With the structure shown, this can conveniently be done by attaching paddle blades 80 to driving arms 46, as shown more clearly in Fig. 8. With blades 80 attached as shown, the reciprocating motion of driving arms 46 is effective in producing a thorough churning or mixing of the material within vat 47.

When the operation of the filling machine is started, such as after the cleaning of the check valve mechanism and piston assembly, chamber 11 will be full of air as well as chamber 17. With the cross beam 47 in its elevated position so as to hold pistons 34 above or outwardly of chamber 11, as shown in Fig. 3, the material to be dispensed within vat 47 will not appreciably enter chamber 11 through the inflow passages because of the air therein. During its first downward movement, piston 34 compresses the air and forces a considerable portion of it outwardly through passage 29 by forcing valve plug 26 away from valve seat 25 to disclose passages 23. The downward position of the cylinder and the valve plug is shown in Fig. 4.

During the up or outward stroke starting from the position of Fig. 4, valve plug 26 seats and a suction is created within chamber 11. When sealing ring 40 moves outwardly beyond point 45, the material within vat 47 flows inwardly through channels 37 and passages 38 and 36 to fill the chamber 11. During the next downward stroke of piston 34, the material to be dispensed is forced downwardly through passage 20 into chamber 17 to completely fill this chamber as well as inside of sleeve 24 and around spring 28. The air trapped within sleeve 27 is forced outwardly through air vents 27 when they are aligned with passages 23 so as to be exhausted throughout passage 29. Thus, after the first two or three dispensing strokes all the air within chambers 11 and 17 is completely exhausted.

After the complete exhaustion of air, the upward or outward movement of piston 34 is effective in creating a substantially complete vacuum within casing 10 until ring 40 clears point 45 and enters beveled or flared portion 44 of the open end 13 at which point chamber 11 fills instantly and completely with the material to be dispensed contained within vat 47. As previously pointed out, the material to be filled flows inwardly through peripheral passages 38 into central passage 36 and thus into chamber 11, while also flowing into chamber 11 through side channels 37.

After chamber 11 has been thus completely filled with the material to be dispensed, the downward movement of piston 34 causes the excess material within chamber 11 to be squeezed outwardly back into vat 80 through the same inflow passages until sealing ring 40 reaches point 45. The flared shaping of open end 13 together with the notches around the periphery of inner flange 42 allows the excess material within chamber 11 to be forced outwardly back into vat 47 until the exact sealing point is reached by this structure, an exact measured quantity of fluid material is trapped within chamber 11 during each dispensing stroke. Further, the material in chamber 11 is uniformly packed before the spring pressed check valve opens for the outflow of material.

During the outflow of material through passage 29 sleeve 24 bearing valve plug 26 is forced downwardly against the closed end 12 of casing 10 while compressing spring 28 is in the position shown in Fig. 4. In this position, the material to be dispensed flows from chamber 11 through passage 20 and ports 23 into outlet passage 29 and thus to dispensing nozzles 70, as shown attached to the outlet conduit in Fig. 1. When piston 34 has reached the bottom of its stroke and begins to move upwardly, spring 28 forces sleeve 24 upwardly to seat valve plug 26. This upward movement of sleeve 24 not only sharply terminates the outflow of fluid through passage 29, but also creates a back suction which is effective in drawing the material back from the ends of nozzles 70 to prevent dripping of the material to be dispensed. As previously pointed out, during its upward motion sleeve 24 functions as a floating piston within guide 21. The upward movement of sleeve 24 increases the displacement within chamber 17 and creates the required back suction without outlet passage 29.

Whenever it is desired to vary the amount to be dispensed by each measuring cylinder per stroke, this can easily be accomplished by utilizing the adjusting means illustrated. For example, coarse adjustments of say from two, four, six or eight ounce settings can be made by shifting the connection of driving rods 48 to a different attachment aperture on wheels 49. Finer adjustments of between ten grams and two ounces can be made by lengthening or shortening rods 48 within sockets 58. The final fine adjustment of say from one to ten grams can be made by utilizing the vernier member 60. It will be noted that the latter two adjustments vary the bottom point of the stroke without varying the overall stroke. It will of course be understood that the relationship between the various elements of the structure can be made such that the different adjusting means will provide an accurate and relatively large range of adjustments.

When it is desired to clean the structure, which would be required at least daily in the case of filling machines for butter and oleomargarine, this can easily be accomplished. In order to clean piston 34, it is only necessary to remove bolt 64 from collar 61 and to lift the piston out of vat 47 by means of arm 46. While removed, as needed, a new sealing ring 40 can be inserted around the rear of piston 34. By noting the vernier setting before removing the piston, it can be replaced on cross beam 47 at the same setting so as to dispense the desired measured quantity of material without requirement of further adjustment. The check valve assembly can also readily be cleaned by removing nuts 33 from tie rods 32 so as to release cup end 18 and partition member 16 from the rest of casing 10. After cleaning the check valve assembly, the members removed can be quickly replaced and outlet passage 29 can be oriented in any desired horizontal direction before clamping the members.

While in the foregoing specification I have set forth specific structures in considerable detail for the purpose of illustrating an embodiment of my invention, it will be understood that many of the details set forth can be varied widely by those skilled in the art without departing from the spirit of my invention.

I claim:

1. In a filling machine, the combination of a casing providing a measuring chamber therein and having an open end and a closed end, an outlet passage communicating with the closed end portion of said chamber, said outlet passage being equipped with an outlet check valve means, an elongated cylindrical plug slidably mounted within said chamber, means for reciprocating said plug between an outer and inner position arranged so that at least the inner end portion of said plug remains within said chamber and the outer end portion thereof is outside of said chamber when said plug is moved to its outer position, said check valve means being arranged to close said outlet passage while said plug is moving toward its outer position, sealing means around the outer end portion of said plug arranged to seal said chamber when said plug is moved inwardly from its outer position to engage the walls of said chamber, said plug having at least one longitudinal passage therethrough from the inner end of said plug to a point on the side of said plug inside of the sealing means, whereby said chamber can be rapidly filled through said passage when the open end of said casing is surrounded by the material to be filled, due to the suction created within said chamber during the movement of said plug toward its outer position.

2. In a filling machine for materials at least partially in liquid condition, the combination of a casing providing a circular measuring chamber therein having an open end and a closed end, an outlet passage communicating with the closed end portion of said chamber, said outlet passage being controlled by a check valve means mounted to permit the outflow but prevent the inflow of material therethrough, a plug of slightly smaller diameter than said chamber slidably mounted within said chamber, said plug having a reduced outer end portion connected to a driving arm, means for reciprocating said driving arm so that at least the inner end portion of said plug remains within said chamber when said plug is moved to its extreme outward position by said driving arm, a flexible resilient sealing ring of slightly larger diameter than said chamber secured around the outer reduced end of said plug between an outer and inner flange, said inner flange having notches around the circumference thereof to assure that said ring will seal said chamber at the same point during each inward movement of said piston, said plug having at least one longitudinal passage therethrough from the inner end of said plug to a point on the side of said plug inside of the sealing ring, whereby said chamber can be filled through said passage with said material when the open end of said casing is mounted in communication with a vat containing said material.

3. The combination of claim 2 wherein said check valve means comprises in combination a partition member extending across said chamber at a spaced distance from said closed end to provide a smaller chamber therebetween, said partition member having a passage therethrough connecting first-mentioned chamber with said smaller chamber, a valve guide tube connected to said partition member aligned with said passage and extending toward the closed end of said first-mentioned chamber but terminating at a spaced distance therefrom, said guide tube having at least one port in the side thereof for outflow from said first-mentioned chamber into said smaller chamber, a valve seat positioned above said port, a sleeve having a closed inner end and an open outer end slidably mounted within said guide tube so as to act as a floating piston therein, a valve plug mounted on the inner end of said sleeve sealably engageable with said valve seat when urged toward said seat, said sleeve having at least one vent therein alignable with said guide tube port when said valve plug is moved outward sufficiently to partially disclose said guide tube port, a compression spring within said sleeve urging said valve plug to engagement with said valve seat, an outlet passage extending from said smaller chamber, whereby as said valve plug moves from its opened to seating position a back suction is produced within said outlet passage.

4. In a filling machine, the combination of a casing providing a measuring chamber therein and having an open end and a closed end, an outlet passage communicating with the closed end portion of said chamber, said outlet passage being equipped with an outlet check valve means, an elongated cylindrical plug slidably mounted within said chamber, means for reciprocating said plug so that at least the inner end portion remains within said chamber when said plug is moved to its extreme outward position, sealing means around the top portion of said plug adapted to seal said chamber when said plug is moved inwardly to engage the walls of said chamber, said plug having at least one channel in the side thereof, and at least one passage extending through said plug, both said channel and said passage extending from the inner end of said plug to a point at the rear of said plug but inside of the sealing means, whereby said chamber can be filled through said channel and said passage when the open end of said casing is surrounded by the material to be filled.

5. In combination with a cylinder providing a chamber, an outlet check valve means comprises in combination a partition member extending across said chamber at a spaced distance from one end thereof to provide a separate chamber therebetween, said partition member having a passage therethrough connecting first-mentioned chamber with said separate chamber, a valve guide tube connected to said partition member aligned with said passage and extending toward the closed end of said first-mentioned chamber but terminating at a spaced distance therefrom, said guide tube having at least one port in the side thereof for outflow from said first-mentioned chamber into said separate chamber, a valve seat positioned above said port, a sleeve having a closed inner end and an open outer end slidably mounted within said guide tube so as to act as a floating piston therein, a valve plug mounted on the inner end of said sleeve sealably engageable with said valve seat when urged toward said seat, said sleeve having at least one vent therein alignable with said guide tube port when said valve plug is moved outward sufficiently to partially disclose said guide tube port, a compression spring within said sleeve urging said valve plug to engagement with said valve seat, an outlet passage extending from said separate chamber, whereby as said valve plug moves from its opened to seating position a back suction is produced within said outlet passage.

6. In combination with a measuring cylinder for a filling machine having an open end and a closed end, an outlet valve means comprising a partition member extending across said chamber at a spaced distance from said closed end to provide a smaller chamber therebetween, said partition member having a passage therethrough connecting first-mentioned chamber with said smaller chamber, a valve guide tube connected to said partition member aligned with said passage and extending toward the closed end of said first-mentioned chamber but terminating at a spaced distance therefrom, said guide tube having at least one port in the side thereof for outflow from said first-mentioned chamber into said smaller chamber, a valve seat positioned above said port, a sleeve having a closed inner end and an open outer end slidably mounted within said guide tube so as to act as a floating piston therein, a valve plug mounted on the inner end of said sleeve sealably engageable with said valve seat when urged toward said seat, said sleeve having at least one vent therein alignable with said guide tube port when said valve plug is moved outward sufficiently to partially disclose said guide tube port, a compression spring within said sleeve urging said valve plug to engagement with said valve seat, an outlet passage extending from said smaller chamber, whereby as said valve plug moves from its opened to seating position a back suction is produced within said outlet passage.

7. The combination of claim 6 in which the outlet passage extending from the smaller chamber extends laterally into the side wall of said chamber so that air trapped within the sleeve reciprocating in said chamber can be more easily exhausted therefrom.

8. In a filling machine, the combination of a casing providing a measuring chamber therein and having an open end and a closed end, an outlet passage communicating with the closed end portion of said chamber equipped with an outlet check valve means, a piston plug slidably mounted within said chamber, a driving arm pivotally connected to the outer end of said piston plug, means for imparting reciprocating motion to said plug including a cross beam attached to the other end of said driving rod, said driving rod being connected to said cross beam through a pivotally mounted housing having an off-center aperture therein threadedly receiving a connecting bolt, whereby upon rotation of said housing the innermost position of said driving arm can be varied over a small range.

9. A filling machine for semi-solid materials, comprising a frame, a vat supported on the upper portion of said frame for containing the semi-solid material to be filled, at least one measuring cylinder having an open upper end and a closed lower end supported in the bottom of said vat with the open end of said cylinder in communication with the interior of said vat, an outlet passage communicating with the closed end portion of said chamber, said outlet passage being equipped with an outlet check valve means yieldably urged toward closed position, an elongated cylindrical plug slidably mounted within said chamber, means for reciprocating said plug between an outer and an inner position arranged so that at least the inner end portion remains within said chamber and the outer end portion thereof is outside of said chamber when said plug is at its outer position, sealing means around the top portion of said plug arranged to seal said chamber when said plug is moved inwardly from its outer position to engage the walls of said chamber, said plug having at least one longitudinal passage therethrough from the inner end of said plug to a point on the side of said plug inside of the sealing means, whereby said chamber can be rapidly filled through said passage when the open end of said casing is surrounded by the material to be filled due to the suction created within said chamber during the movement of said plug toward its outer position.

10. In combination with a measuring cylinder having an outlet passage leading therefrom to a dispensing point, a piston mounted for reciprocation in said passage having the end thereof nearest said measuring cylinder bearing a valve plug, said piston sealably engaging a portion of the walls of said passage for a substantial distance as it is moved toward said measuring cylinder so as to create back-suction during this movement while opening said passage to the outflow of material therethrough when moved away from said measuring cylinder out of contact with said sealably engaged portion, a valve seat interposed in said passage at the end of said sealably engaged portion nearest said measuring cylinder for receiving said valve plug to close said passage, and spring means for urging said piston and valve plug toward said valve seat whereby said valve plug functions as an outflow check valve for said measuring cylinder and at the same time as a back-suction piston to provide a non-drip cut-off, said springs means yielding to permit said piston and valve plug to move away from said valve seat under fluid pressure from said measuring cylinder out of contact with said sealably engaged passage portion to allow material to flow through said passage to said dispensing point.

11. In combination with a measuring cylinder having an outlet passage leading therefrom, said passage having an outlet port in the side thereof communicating with a dispensing point, a piston mounted for reciprocation in said passage adjacent said outlet port adapted to produce a back suction through said outlet port to said dispensing point by sealably engaging a portion of said passage between said port and said measuring cylinder when moved toward said measuring cylinder and to disclose said port when moved away from said measuring cylinder to open said passage and permit the outflow of material through said port, said piston having the end thereof nearest said measuring cylinder adapted to provide a valve plug, a valve seat interposed in said passage between said piston and said measuring cylinder within said sealably engaged passage portion, guide means for maintaining said piston in alignment with said sealably engaged passage portion and said valve plug with said valve seat, spring means urging said piston and valve plug towards said valve seat to engage said valve plug therewith and thereby close said passage, said spring means yielding to permit said piston and valve plug to move away from said valve seat and disclose said port under fluid pressure from said measuring cylinder.

12. In a filling machine, the combination of a casing providing a measuring chamber therein and having an open end and a closed end, an outlet passage communicating with the closed end portion of said chamber, said outlet passage being equipped with an outlet check valve means, an elongated cylindrical piston mounted for sliding within said chamber, sealing means around said piston adapted to seal said chamber when said piston is moved inwardly to engage said sealing means with the walls of said chamber, guide means secured to said piston and extending inwardly from said sealing means to maintain said piston in alignment with said chamber when withdrawn from said chamber so that said sealing means are outside of said chamber, said guide means being adapted to permit the passage of material therethrough into or out of said chamber when said sealing means is withdrawn from said chamber, and means for reciprocating said piston including means for limiting the length of the inward and outward strokes imparted to said piston so that in its outermost position the sealing ring of said piston is outside of said chamber while at least the inner end of said guide means remains within said chamber, said check valve means closing said outlet passage while said piston is being moved to its outermost position, thereby creating suction within said chamber which progressively increases during the outward movement of said piston until said sealing ring disengages from the walls of said chamber.

13. The combination of claim 12 in which said guide means comprises an elongated cylindrical plug of slightly smaller diameter than said chamber and having at least one longitudinal passage therethrough from the inner end of said plug to a point on the side of said plug inside of the sealing means but back of the plug portion remaining within said chamber at the outermost point of reciprocation of said piston.

14. In combination with a measuring cylinder having an open end of about the same diameter as said cylinder, a piston mounted for reciprocation into and out of said cylinder through said open end, a flexible, resilient sealing ring of slightly larger diameter than said cylinder secured around said piston against an inner flange, said inner flange normally of slightly smaller outside diameter than said sealing ring having notches around the outer periphery thereof to assure that said ring will seal said chamber on the same line for each inward movement of said piston, and means for reciprocating said piston.

15. The combination of claim 14 in which said open cylinder end is flared outwardly from a circumferential line so that as said piston is moved inwardly said sealing ring is prevented from prematurely establishing sealing engagement with said cylinder while passing through said flared portion and enters into sealing engagement upon reaching said circumferential line.

References Cited in the file of this patent

UNITED STATES PATENTS

| | | |
|---|---|---|
| 559,540 | Robertson et al. | May 5, 1896 |
| 580,322 | Lauderdale | Apr. 6, 1897 |
| 751,555 | Prescott | Feb. 9, 1904 |
| 857,814 | Lippincott | June 25, 1907 |
| 987,970 | Earl | Mar. 28, 1911 |
| 1,480,097 | Morlock | Jan. 8, 1924 |
| 1,485,561 | Joy, Jr. et al. | Mar. 4, 1924 |
| 1,641,280 | Joslin et. al | Sept. 6, 1927 |
| 1,783,419 | Fitch | Dec. 2, 1930 |
| 1,845,039 | Alvey | Feb. 16, 1932 |
| 1,874,612 | Peterson | Aug. 30, 1932 |
| 1,886,022 | Hutton | Nov. 1, 1932 |
| 2,415,419 | Cozzoli | Feb. 11, 1947 |